(12) United States Patent
Lim

(10) Patent No.: US 9,181,102 B2
(45) Date of Patent: Nov. 10, 2015

(54) METHOD FOR PRODUCING CRYSTALLIZED SALT AND BITTERN WITH A SYSTEM THROUGH THE EVAPORATION PROCESS

(71) Applicant: Jae Hyun Lim, Cresskill, NJ (US)

(72) Inventor: Jae Hyun Lim, Cresskill, NJ (US)

(73) Assignee: PIOLI SYSTEMS INC., Palisades Park, NJ (US)

( * ) Notice: Subject to any disclaimer, the term of this patent is extended or adjusted under 35 U.S.C. 154(b) by 285 days.

(21) Appl. No.: 14/035,312

(22) Filed: Sep. 24, 2013

(65) Prior Publication Data

US 2014/0020850 A1    Jan. 23, 2014

(51) Int. Cl.
*C01D 1/30*  (2006.01)
*C01D 3/06*  (2006.01)
*E02B 17/00* (2006.01)
*E02B 17/02* (2006.01)

(52) U.S. Cl.
CPC .............. *C01D 3/06* (2013.01); *E02B 17/0017* (2013.01); *E02B 17/02* (2013.01)

(58) Field of Classification Search
CPC ......................................... C01D 1/30
USPC ........................................................... 23/303
See application file for complete search history.

(56) References Cited

PUBLICATIONS

Brophy, James. "Magma Composition and Igneous Rocks." N.p., n.d. pp. 1-6. Web. <http://www.indiana.edu/~volcano/notes/handout2.pdf>.
Nelson, Stephen A. "Trace Elements as Clues to Suites Produced by Various Degrees of Melting." Magmatic Differentiation. Tulane University, Jan. 30, 2012. Web. <http://www.tulane.edu/~sanelson/eens212/magmadiff.htm>.
"Detailed Composition of Seawater." Chemistry of Seawater. Ocean Health, n.d. Web. <http://oceanplasma.org/documents/chemistry.html>.

*Primary Examiner* — Edward Johnson

(57) ABSTRACT

A Floating Salt Farm is a system which uses extracted seawater to reliably and regularly produce substantial amounts of crystallized salt and bittern through the evaporation process. The seawater used for the evaporation process of the Floating Salt Farm can be 1) seawater affected by volcanic activities, 2) seawater affected by spring water from thermal springs, and 3) seawater extracted from specific water depths and from specific offshore locations. The crystallized salt and bittern to be produced are affected by placing contents, such as volcanic rocks, inside the evaporator tank with the seawater during the evaporation process.

23 Claims, 19 Drawing Sheets

METHOD FOR PRODUCING CRYSTALLIZED SALT AND BITTERN WITH A SYSTEM THROUGH THE EVAPORATION PROCESS

CROSS-REFERENCE TO RELATED APPLICATIONS

This present Application is a continuation-in-part of U.S. patent application Ser. No. 13/662,534 filed on Oct. 28, 2012, which claims priority to U.S. Provisional Application No. 61/771,804 filed on Mar. 02, 2013, and U.S. Provisional Application No. 61/872,691 filed on Aug. 31, 2013. The entire disclosures of all these Applications are incorporated herein by reference.

FIELD OF INVENTION

A method for producing crystallized salt and bittern with a system through the evaporation process.

BACKGROUND OF THE INVENTION

A Floating Salt Farm is a system which uses extracted seawater to reliably and regularly produce substantial amounts of crystallized salt and bittern through the evaporation process, in which the produced crystallized salt and bittern are produced to have specific properties, such as specific mineral compositions.

BRIEF SUMMARY OF THE INVENTION

A Floating Salt Farm is a system, in which its purpose is to produce crystallized salt and bittern through the evaporation process. The Floating Salt Farm components can be separately installed at different offshore and/or onshore locations. In an embodiment of the Floating Salt Farm, Floating Salt Farm components are separately installed at an offshore location and at an onshore location. In an embodiment of the Floating Salt Farm, Floating Salt Farm components are separately installed at different offshore locations.

The Floating Salt Farm can be operated continuously at any time and at any location, in the condition that energy sources, such as electricity, gas, and fuel, are reliably and regularly supplied. These energy sources can be used in combination to supply the operating Floating Salt Farm with energy continuously.

The extracted seawater, which is used to produce the crystallized salt and bittern with the Floating Salt Farm, can be seawater affected by volcanic activities or by spring water from thermal springs, in which the affected seawater contains substantial amounts of specific chemical elements, such as Magnesium, Aluminum, Calcium, Potassium, Bromine, Silicon, Titanium, Copper, Zinc, Selenium, Lithium, Cerium, Neodymium, Dysprosium, Lanthanum, Europium, Yttrium, and Uranium. By using this affected seawater, the produced crystallized salt and bittern can contain these chemical elements after the evaporation process in substantial amounts. These chemical elements can then be extracted from the produced crystallized salt and bittern.

Crystallized salt and bittern can also be produced with the Floating Salt Farm by using seawater extracted from specific water depths and from specific offshore locations, in which the extracted seawater contains amounts of specific chemical elements. The amounts of specific chemical elements of the produced crystallized salt and bittern can be increased by placing contents, such as volcanic rocks, which can be formed from magma and are found in volcanic areas, inside the evaporator tank of the Floating Salt Farm with the seawater during the evaporation process.

DETAILED DESCRIPTION OF THE INVENTION

Detailed embodiments of the invention can be illustrated using the accompanying drawings as reference.

A Floating Salt Farm is a system, in which its purpose is to produce crystallized salt and bittern through the evaporation process using extracted seawater.

Figure 1:
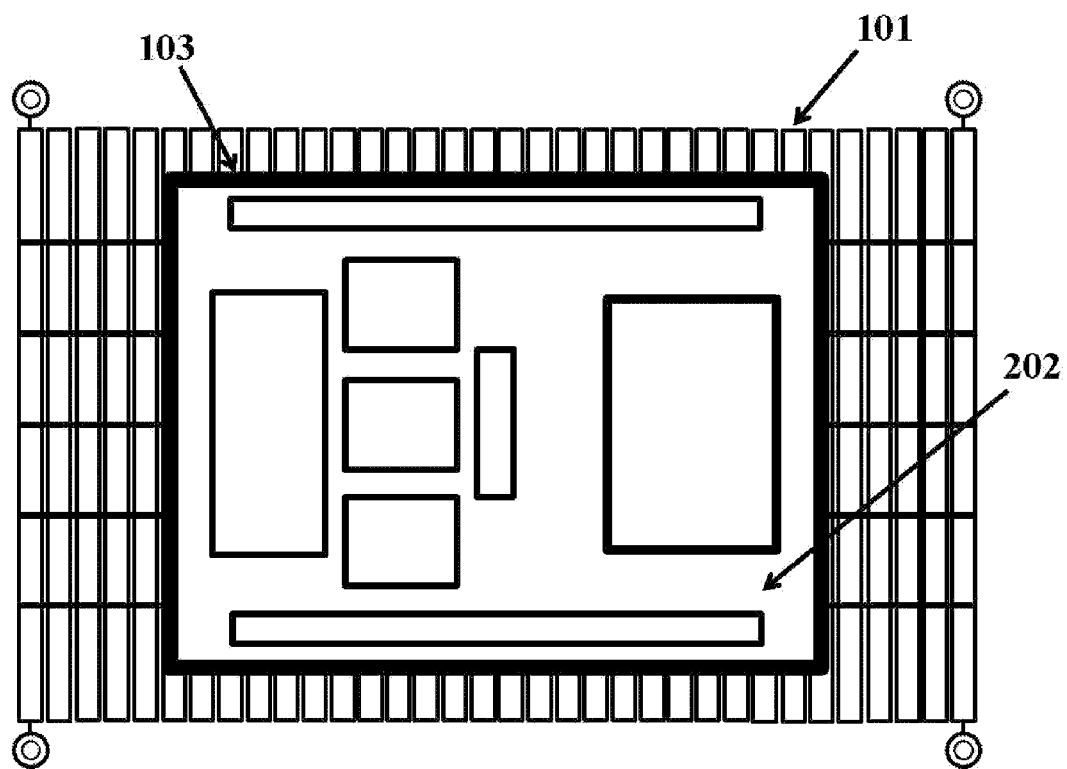
FIG. 1 is a top view of an embodiment of a Floating Salt Farm.

The buoyant foundation 101 of the Floating Salt Farm 201 must have sufficient buoyancy and must be able to support the weight of the Floating Salt Farm components 202, which lie on the buoyant foundation 101, as shown in FIG. 1. The Floating Salt Farm components 202 are installed on the flooring deck 103, in which the flooring deck 103 is fixed onto the top of the buoyant foundation 101.

Figure 2A:
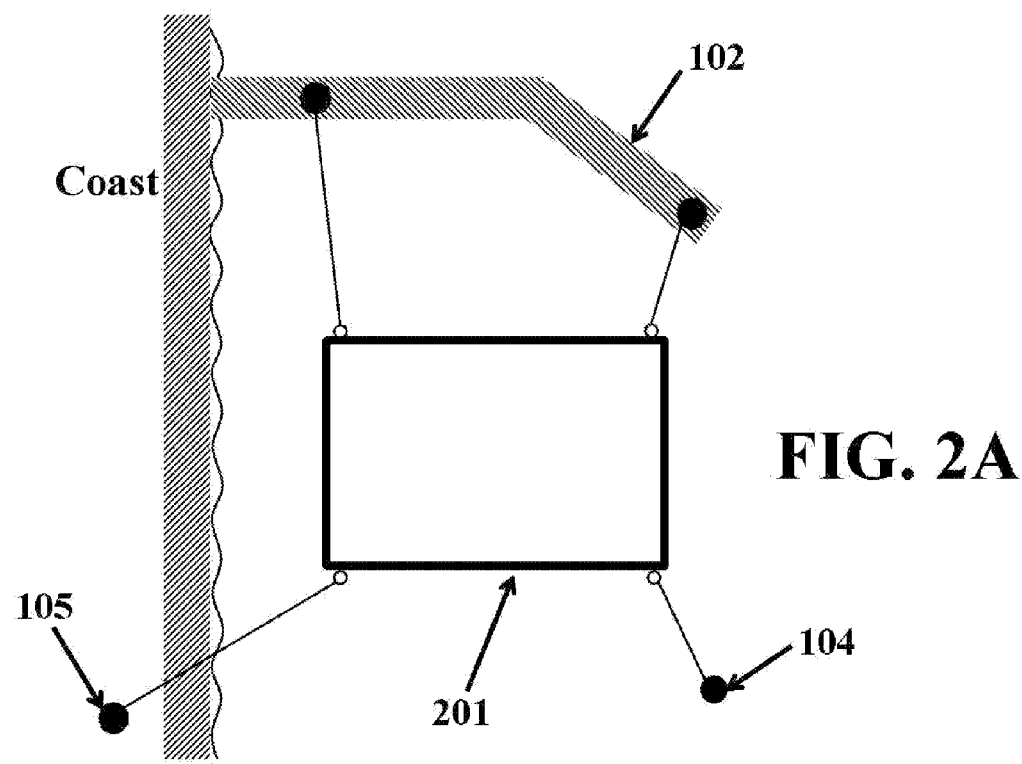
FIG. 2A is a top view of an embodiment of a Floating Salt Farm reinforced with a combination of an offshore structure and onshore structures.
Figure 5:
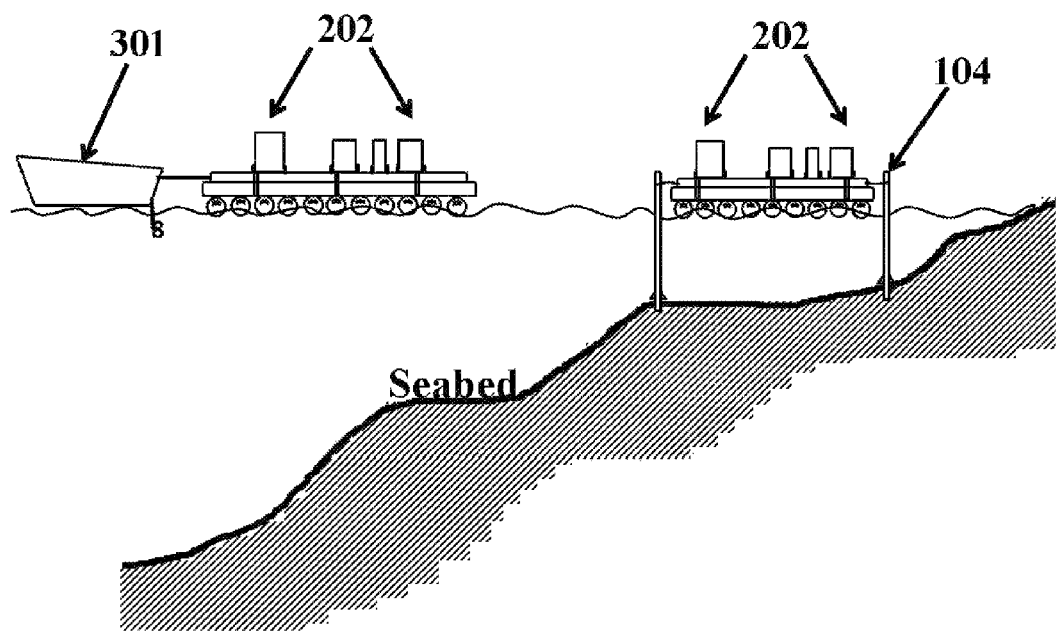
FIG. 5 is a side view of an embodiment of a Floating Salt Farm reinforced with offshore structures and an embodiment of a Floating Salt Farm moved by using a towboat.

The stability of the Floating Salt Farm 201 must be sufficient to withstand inclement weather conditions and hitting sea waves. Offshore structures 104 can be used to reinforce the Floating Salt Farm 201, as shown in FIG. 5. A combination of onshore structures 105 and offshore structures 104 can also be used to reinforce the Floating Salt Farm 201, as shown in FIG. 2A. In this embodiment, a breakwater 102 protects the Floating Salt Farm 201 from hitting sea waves.

Figure 2B:
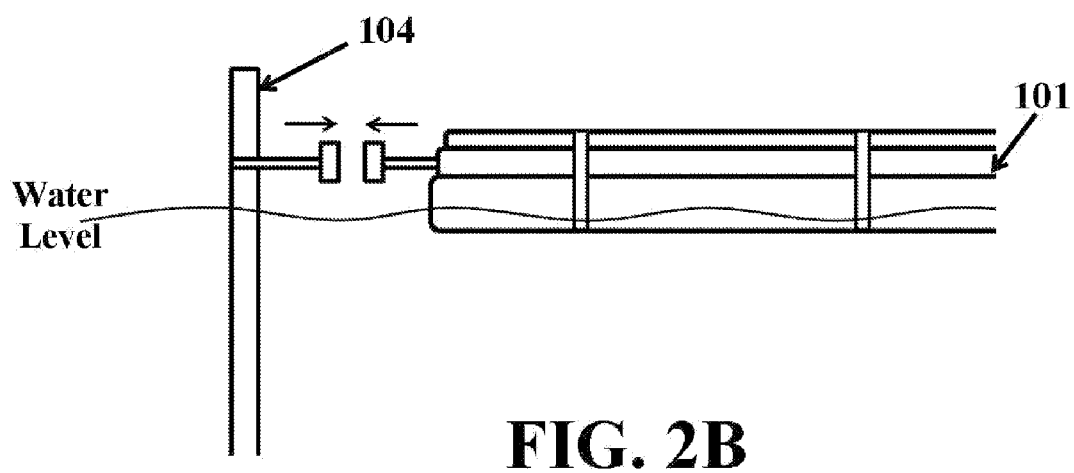
FIG. 2B is a side view of an embodiment of a detachable connection between an offshore structure and the buoyant foundation of a Floating Salt Farm.

The connection between the buoyant foundation 101 of the Floating Salt Farm 201 and the offshore structure 104 can be detachable, as shown in FIG. 2B.

Figure 3:
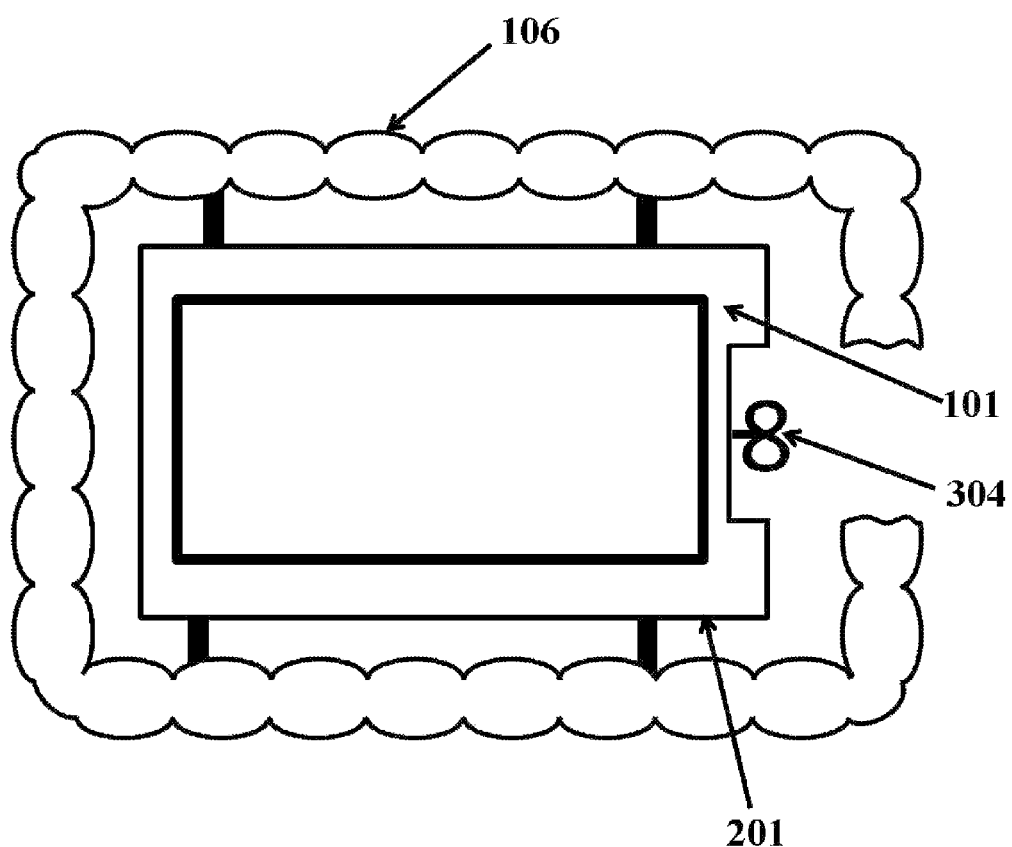
FIG. 3 is a top view of an embodiment of a Floating Salt Farm with an installed buoyant seawall.

A buoyant seawall 106 can be installed to increase the buoyancy and stability of the Floating Salt Farm 201. A buoyant seawall 106 is located around the perimeter of and slightly away from the buoyant foundation 101 of the Floating Salt Farm 201, as shown in FIG. 3. The connection between the buoyant foundation 101 of the Floating Salt Farm 201 and the buoyant seawall 106 can be detachable.

Figure 4:
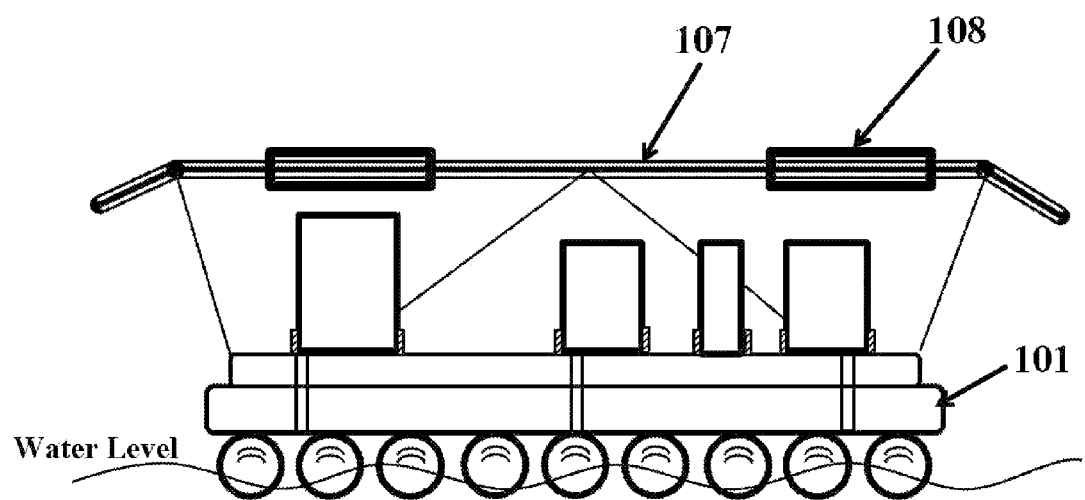
FIG. 4 is a side view of an embodiment of a Floating Salt Farm with an installed customized ceiling.

The Floating Salt Farm components 202 can be further protected from weather conditions, such as rain and snow, by installing a customized ceiling 107, as shown in FIG. 4. The customized ceiling 107 can have installed windows 108, which can be moveable and controlled along the surface of the customized ceiling 107 to intake sunlight for the installed photovoltaic panel components 208, in which the photovoltaic panels components 208, as shown in FIG. 6, are optional components of the Floating Salt Farm 201.

Figure 6:
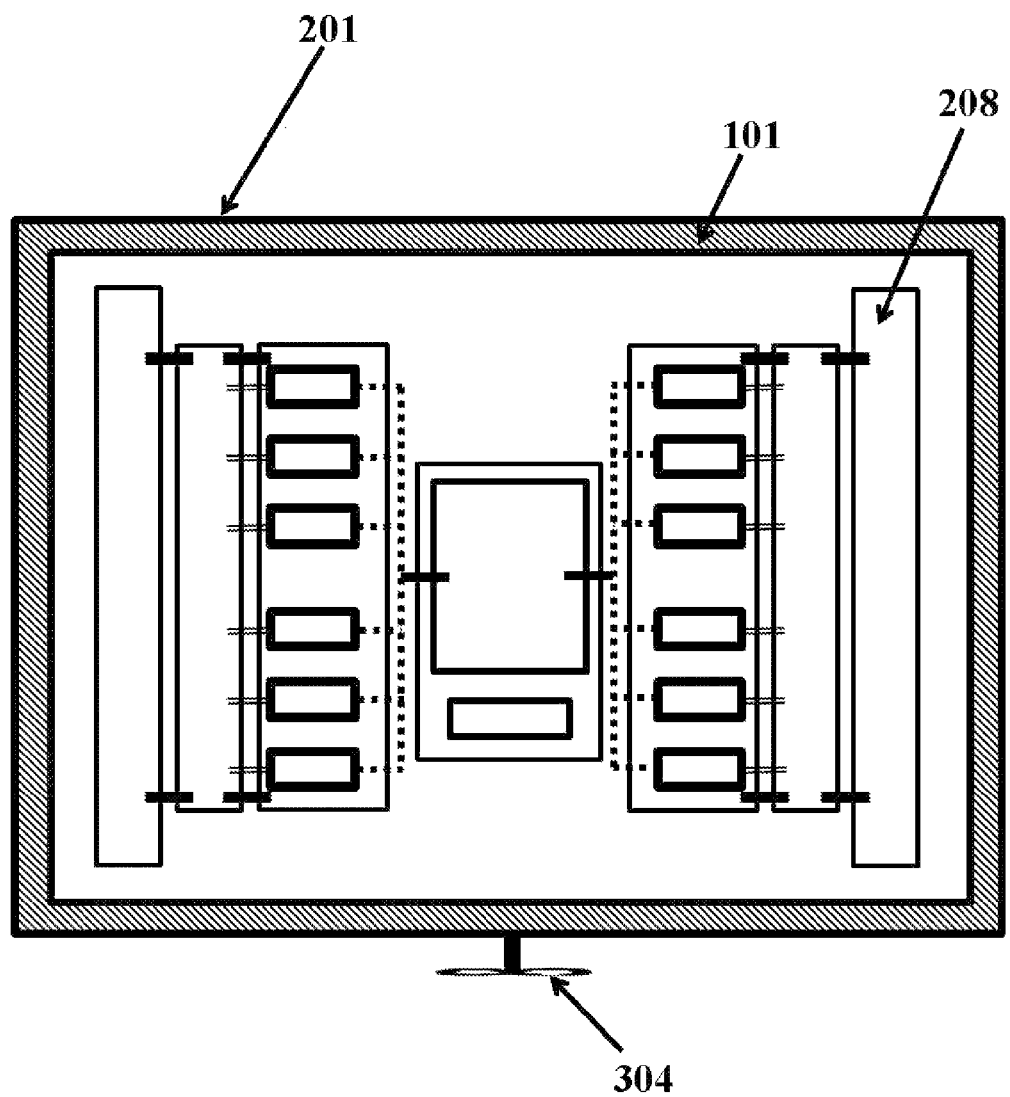
FIG. 6 is a top view of an embodiment of a Floating Salt Farm with an installed motor propeller component.

At offshore locations where the Floating Salt Farm 201 cannot be reinforced with offshore structures 104, the Floating Salt Farm 201 is moved by using a towboat 301, as shown in FIG. 5, or is moved through an installed motor propeller component 304, as shown in FIG. 6, when transporting the Floating Salt Farm 201 to a specific offshore location to extract seawater for the evaporation process or moving the Floating Salt Farm 201 to a safe location during times of inclement weather conditions. In the embodiment shown in FIG. 6, the buoyant foundation 101 of the Floating Salt Farm 201 is a barge with an installed motor propeller component 304.

Figure 7:
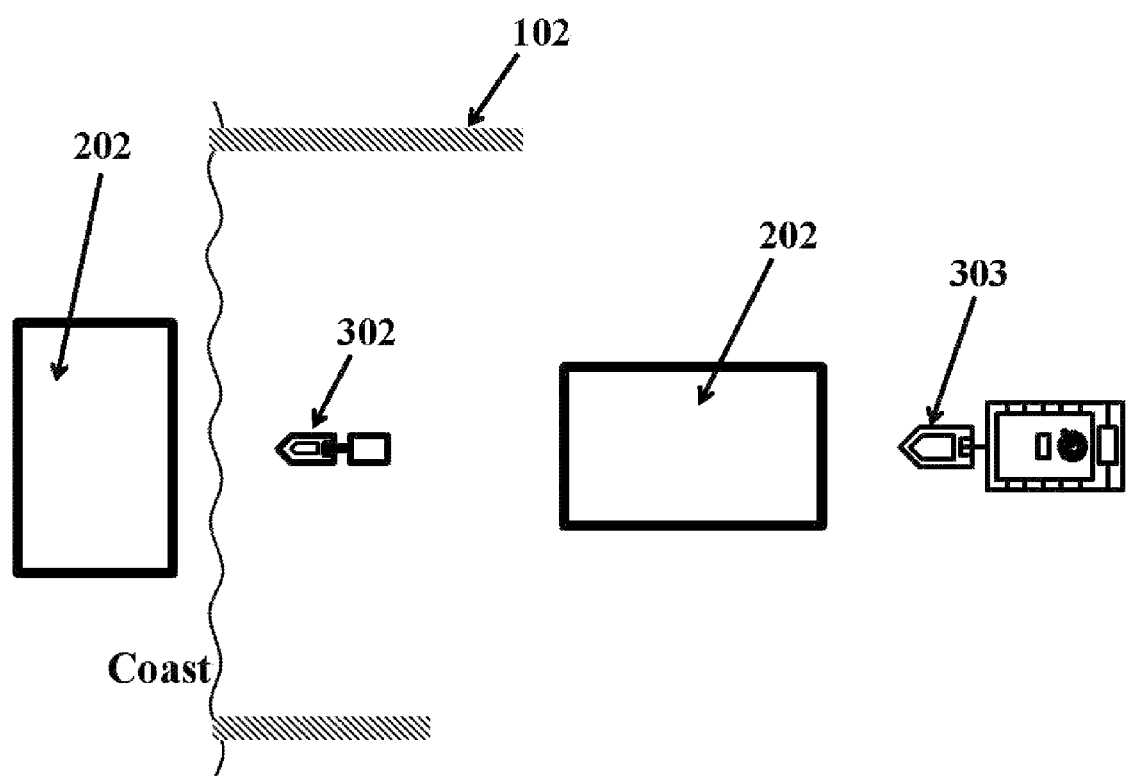
FIG. 7 is a top view of an embodiment of the Floating Salt Farm components separately installed at an offshore location and an onshore location.

At locations where higher stability may be needed, such as at locations with recurring inclement weather conditions, some Floating Salt Farm components 202 can be separately installed at a safe location, such as at a harbor with breakwaters 102, as shown in FIG. 7.

In the embodiment shown in FIG. 7, a seawater extraction vessel 303 extracts seawater at a specific offshore location, in which the seawater extraction vessel 303 delivers the extracted seawater to some Floating Salt Farm components 202, which are installed at an onshore location, to conduct the evaporation process. After the evaporation process, the transport vessel 302 delivers the produced crystallized salt and bittern to the other Floating Salt Farm components 202, which are installed at an onshore location.

In other embodiments, a seawater extraction vessel 303 extracts seawater at a specific offshore location, in which the seawater extraction vessel 303 delivers the extracted seawater to some Floating Salt Farm components 202, which are installed at an offshore location, to conduct the evaporation process. After the evaporation process, the transport vessel 302 delivers the produced crystallized salt and bittern to the other Floating Salt Farm components 202, which are installed at a different offshore location.

Figure 8:
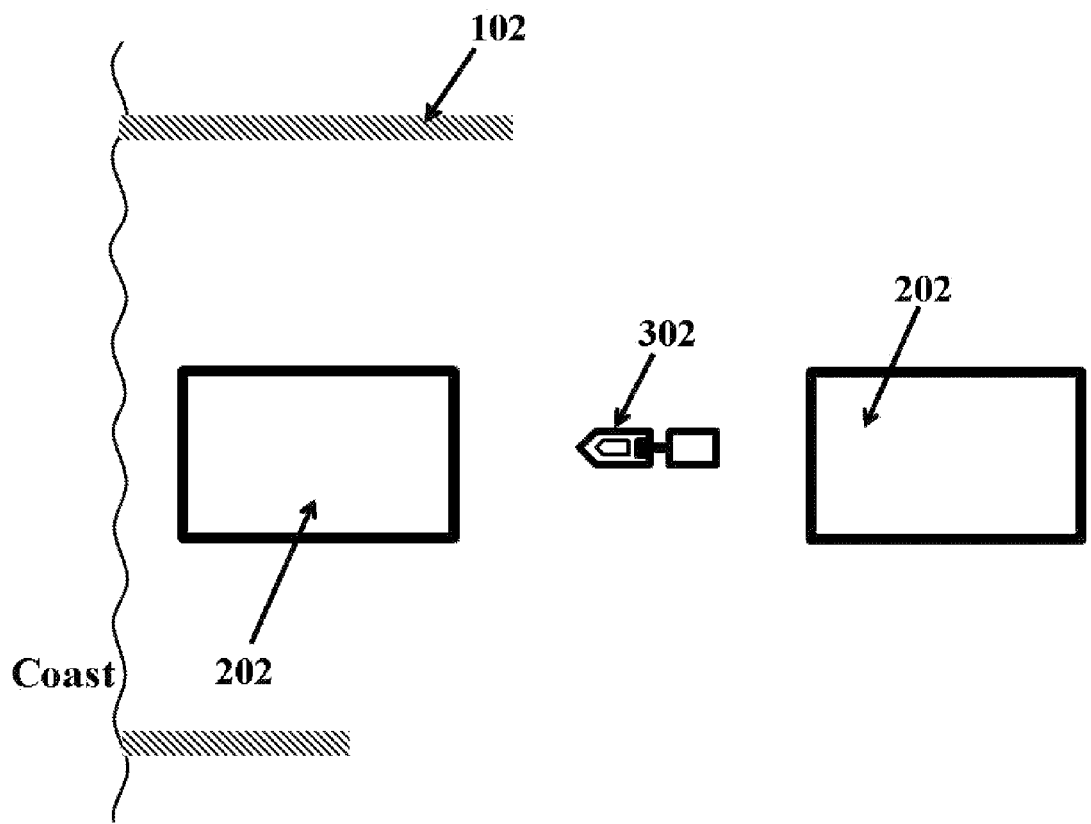
FIG. 8 is a top view of an embodiment of the Floating Salt Farm components separately installed at different offshore locations.

In the embodiment shown in FIG. 8, some Floating Salt Farm components 202 are located at a specific offshore location to extract seawater for the evaporation process. After the evaporation process, the transport vessel 302 delivers the produced crystallized salt and bittern to the other Floating Salt Farm components 202, which are installed at a different offshore location.

Figure 9A:
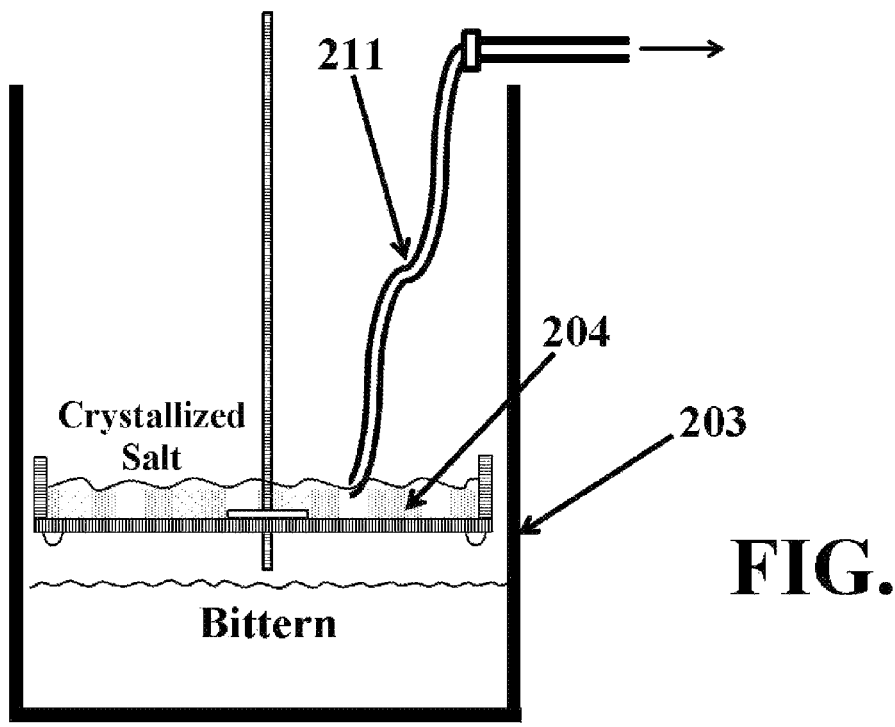
FIGS. 9A and 9B are side views of embodiments of the evaporator plate component inside and above the evaporator tank, respectively.
Figure 9B:
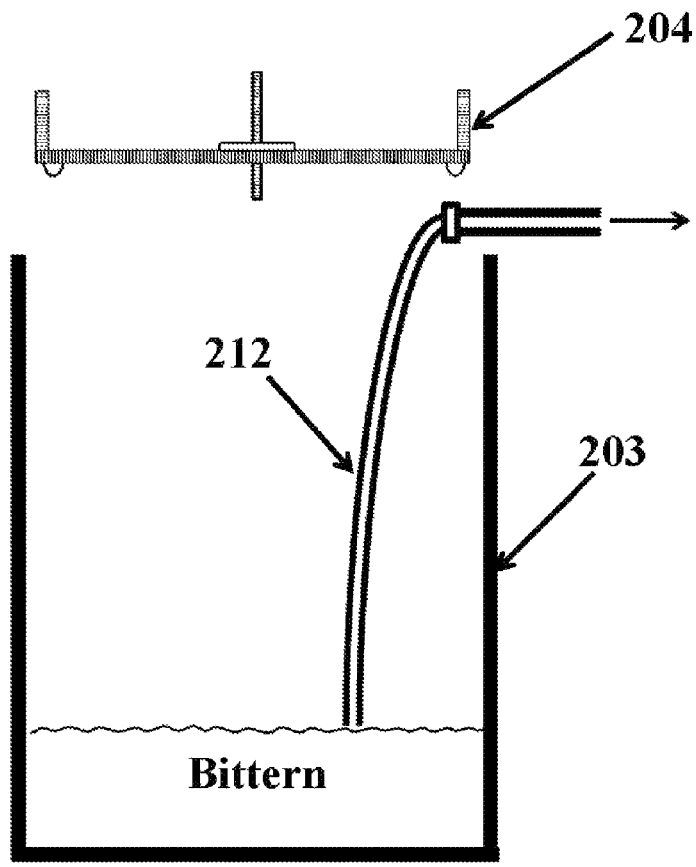

During the evaporation process of the Floating Salt Farm 201, the evaporator plate component 204 is placed inside the evaporator tank 203 and the water vapor produced is released to the atmosphere. After the evaporation process, the produced crystallized salt lies at the surface of the evaporator plate component 204 and the produced bittern is located below the evaporator plate component 204, as shown in FIG. 9A. The produced crystallized salt at the surface of the evaporator plate component 204 is extracted using a crystallized salt extraction tube 211. After extracting the produced crystallized salt, the evaporator plate component 204 is lifted above the top of the evaporator tank 203, as shown in FIG. 9B, and the produced bittern is extracted using a bittern extraction tube 212.

Figure 10A:
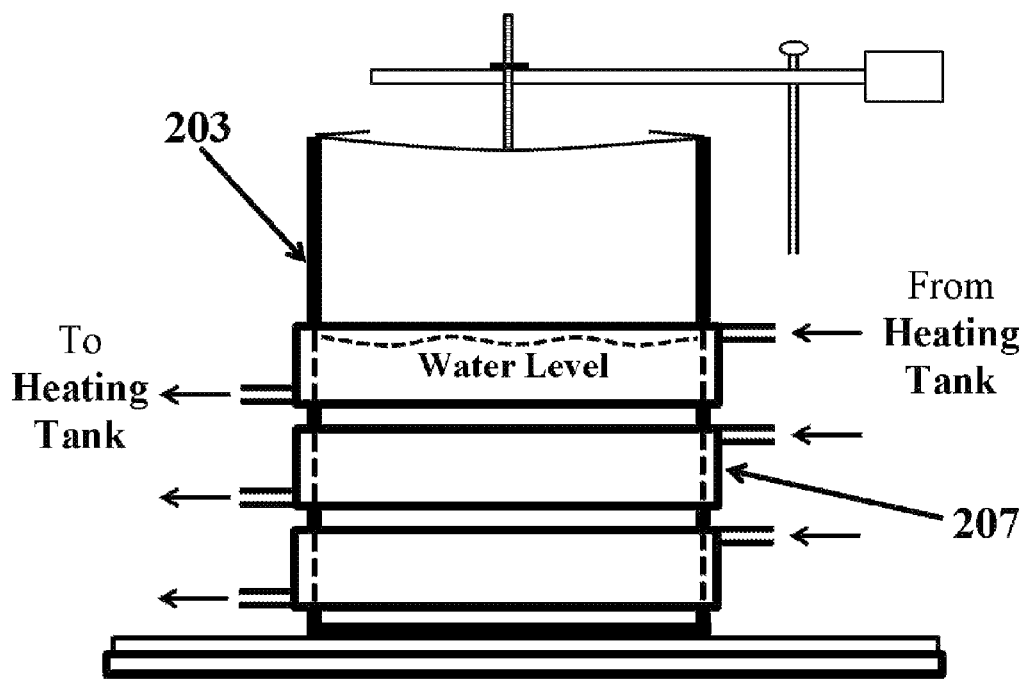
FIGS. 10A and 10B are side views of embodiments of heat exchangers attached to the outer surface and coiled around the inner surface of the evaporator tank, respectively.
Figure 10B:
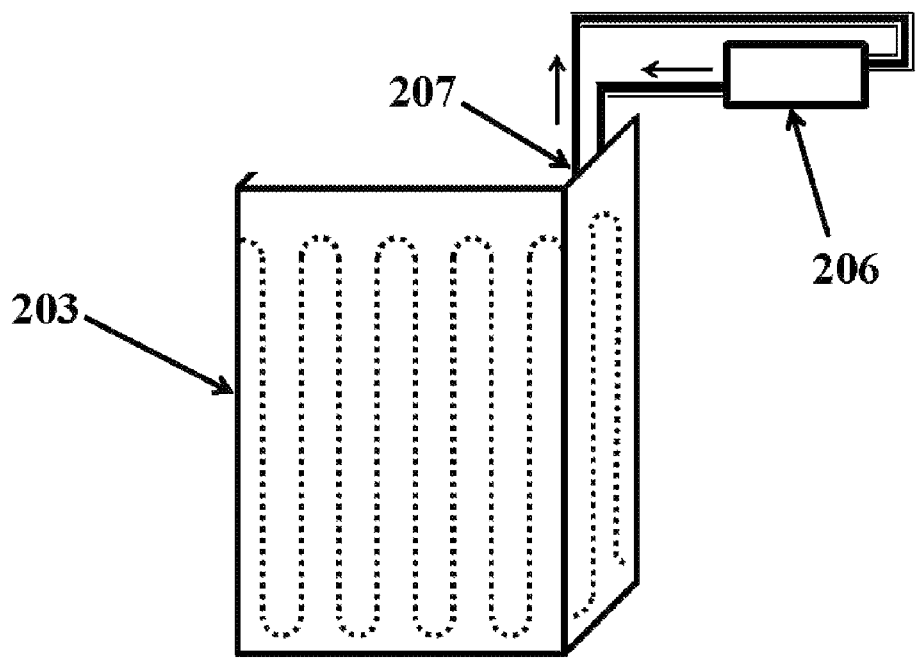

The heating used for the evaporation process is provided through heat exchangers 207, which are connected to the heating tank 206. In the embodiment shown in FIG. 10A, heating for the evaporation process is supplied through heat exchangers 207 attached to the outer surface of the evaporator tank 203. In the embodiment shown in FIG. 10B, heating for the evaporation process is supplied through a heat exchanger 207 coiled around the inner surface of the evaporator tank 203.

The Floating Salt Farm 201 can be operated continuously at any time and at any location, in the condition that energy sources, such as electricity, gas, and fuel, are reliably and regularly supplied. These energy sources can be used in combination to supply the operating Floating Salt Farm 201 with energy continuously.

Figure 11A:
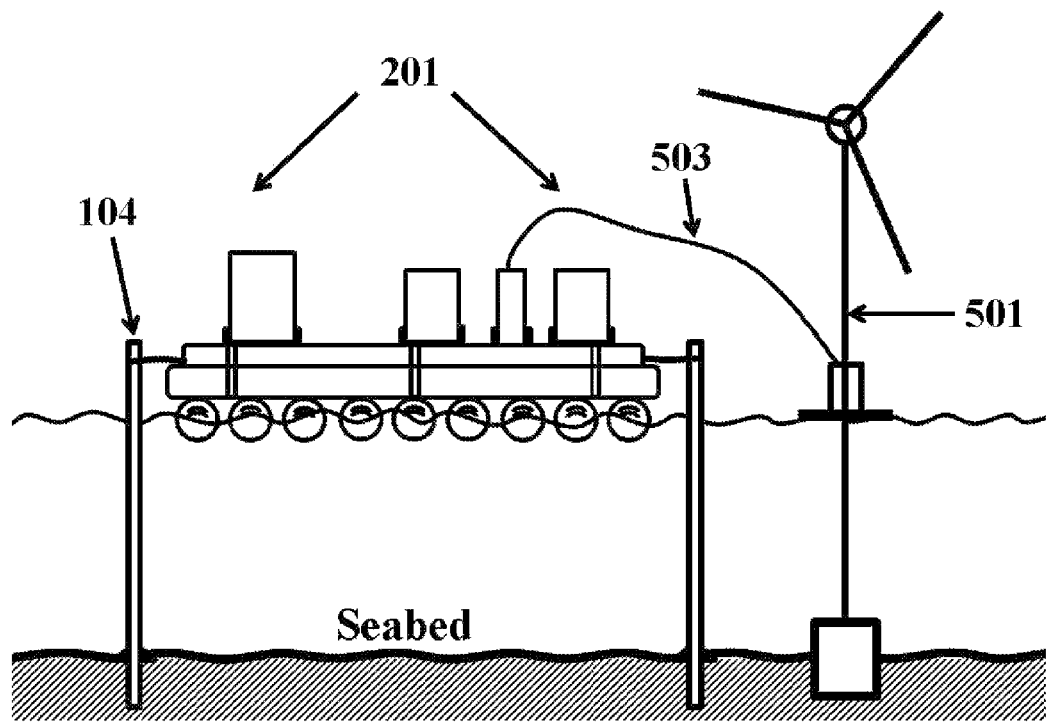
FIG. 11A is a side view of an embodiment of an offshore fixed-bottom wind turbine powering the Floating Salt Farm.
Figure 11B:
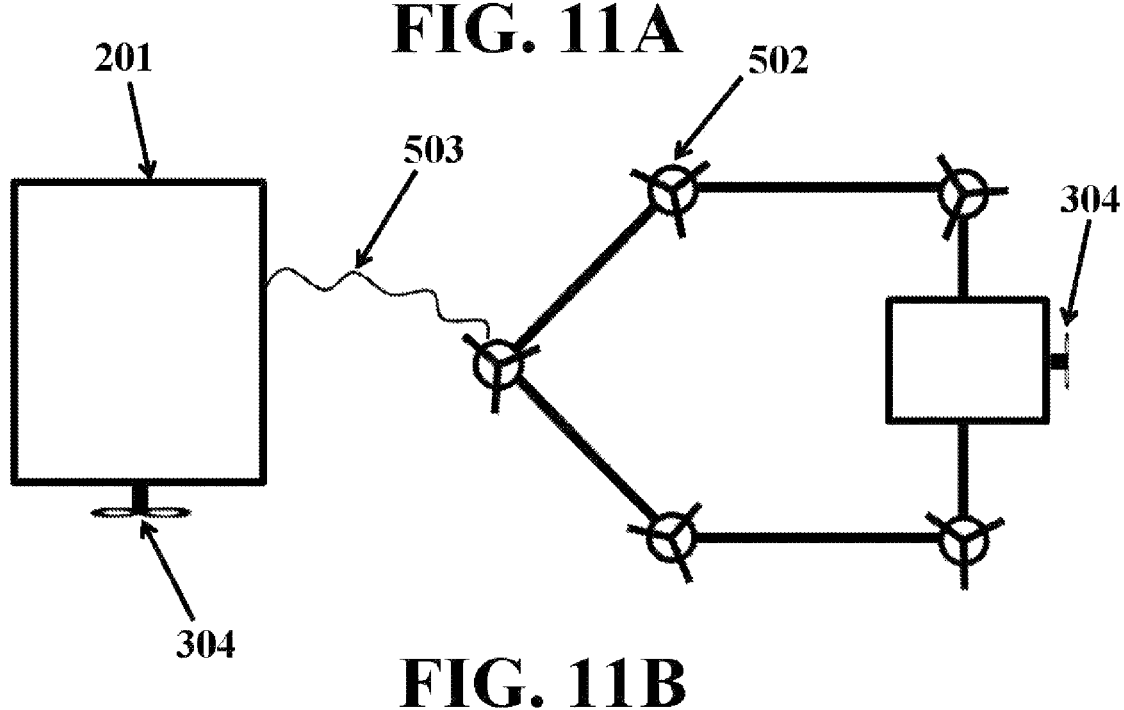
FIG. 11B is a side view of an embodiment of offshore floating wind turbines powering the Floating Salt Farm.
Figure 11C:
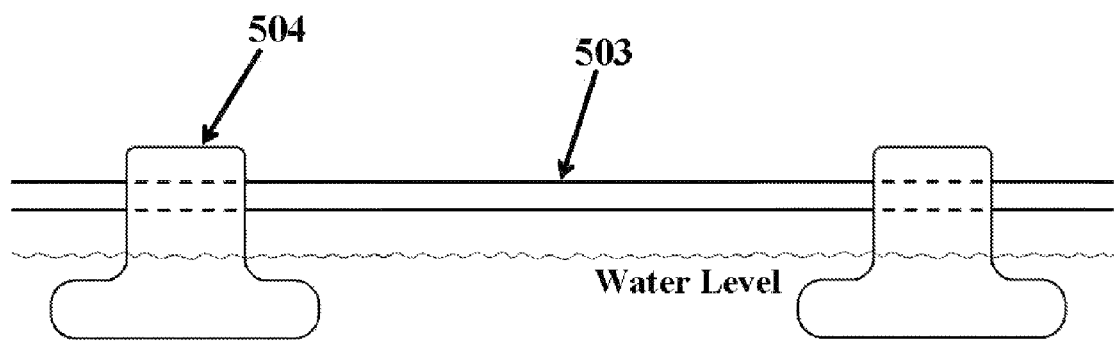
FIG. 11C is a side view of an embodiment of an electric cable supported by buoyant cable supports.

Offshore fixed-bottom wind turbines 501 and offshore floating wind turbines 502 can be used to supply electricity to power the Floating Salt Farm 201, as shown in FIGS. 11A and 11B. The electricity generated from the offshore fixed-bottom wind turbines 501 and offshore floating wind turbines 502 is supplied to the Floating Salt Farm 201 through electric cables 503. In the embodiment shown in FIG. 11A, an offshore fixed-bottom wind turbine 501 supplies electricity to power the Floating Salt Farm 201. In the embodiment shown in FIG. 11B, offshore floating wind turbines 502, which can be moved through an installed motor propeller component 304, supply electricity to power the Floating Salt Farm 201. The electric cable 503 connecting the Floating Salt Farm 201 and the offshore fixed-bottom wind turbine 501 or the offshore floating wind turbine 502, can be supported by a buoyant cable support 504 to keep the electric cable 503 above the water level, as shown in FIG. 11C.

Figure 12A:
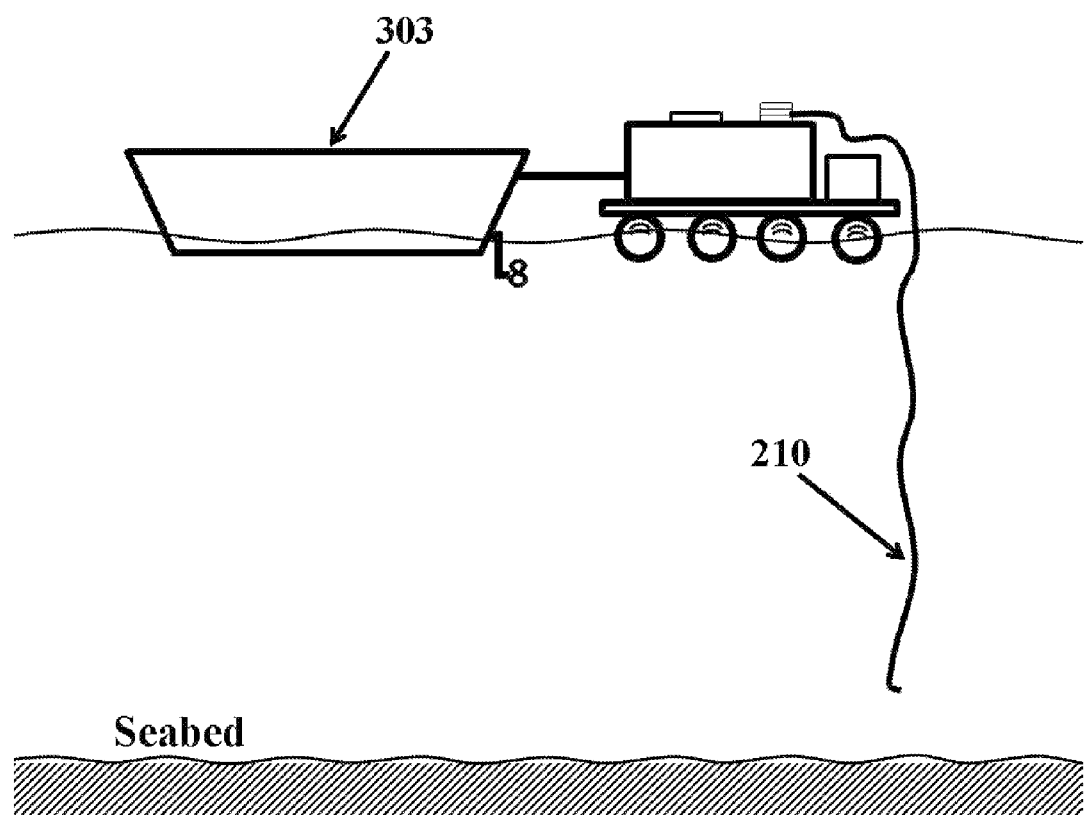
FIG. 12A is a side view of an embodiment of a seawater extraction vessel extracting seawater from a specific water depth and from a specific offshore location.

The seawater to be used for the evaporation process of the Floating Salt Farm 201 can be extracted from specific water depths and from specific offshore locations by using the seawater extraction tube 210 of the seawater extraction vessel 303, as shown in FIG. 12A, to extract seawater containing amounts of specific chemical elements.

Figure 12B:
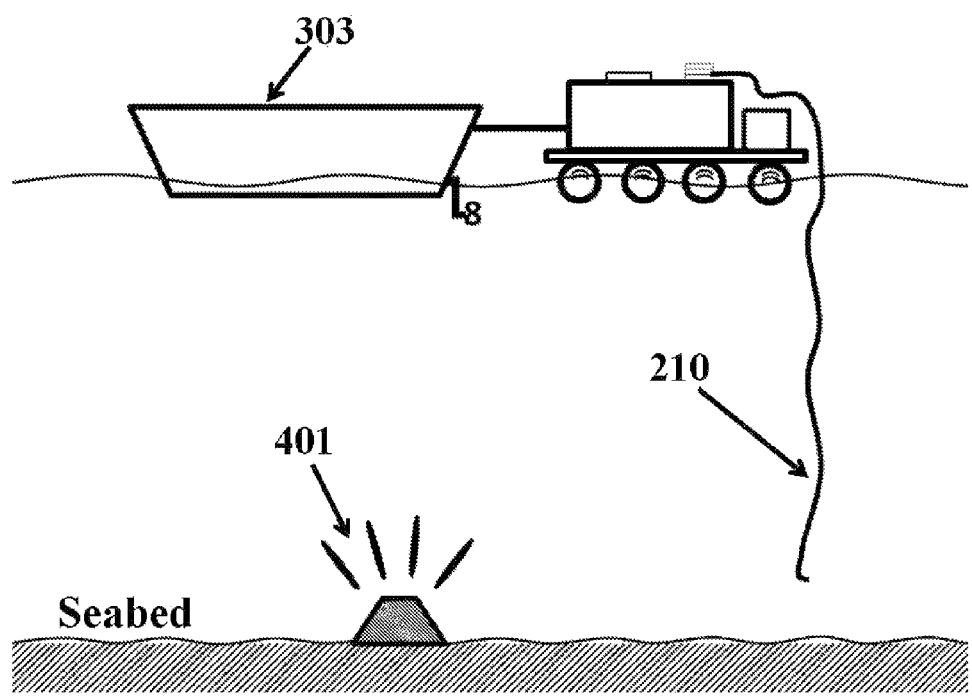
FIGS. 12B and 12C are side views of an underwater volcano and a volcano located above sea level, respectively, in which have affected the seawater to be extracted.
Figure 12C:
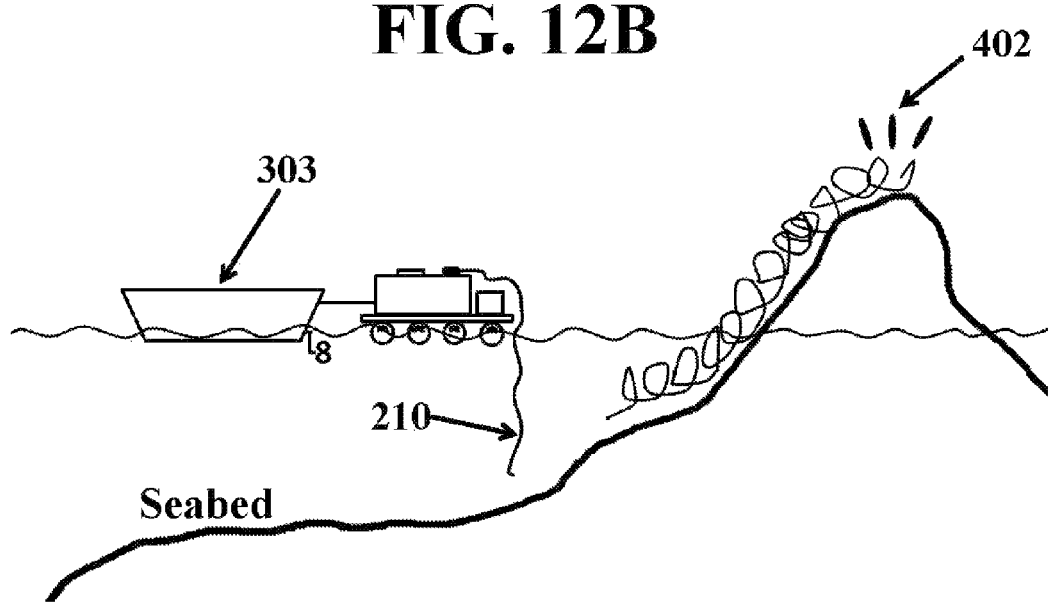

The extracted seawater to be used for the evaporation process of the Floating Salt Farm 201, can be seawater which has been affected by volcanic activities and can contain substantial amounts of specific chemical elements. The volcanic activities, which have affected the seawater to be used for the evaporation process of the Floating Salt Farm 201, originate from underwater volcanoes 401, as shown in FIG. 12B, or from volcanoes located above sea level 402, as shown in FIG. 12C.

Figure 12D:
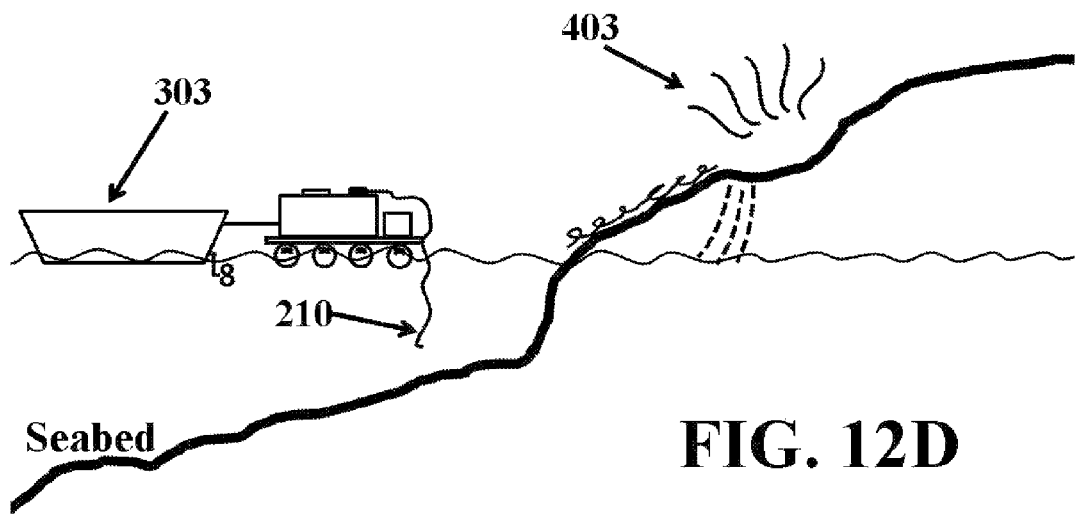
FIGS. 12D and 12E are side views of a thermal spring located above sea level and an underwater thermal spring, respectively, in which have affected the seawater to be extracted.
Figure 12E:
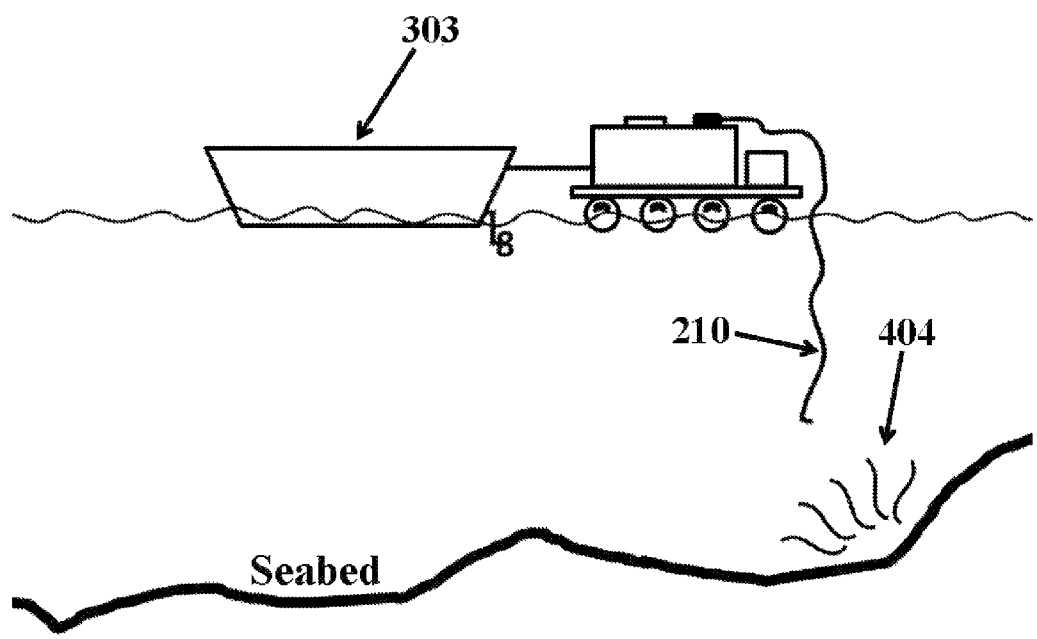

The extracted seawater to be used for the evaporation process of the Floating Salt Farm 201 can also be seawater which has been affected by spring water from thermal springs and can contain substantial amounts of specific chemical elements. The spring water, which has affected the seawater to be used for the evaporation process, originate from thermal springs located above sea level 403, as shown in FIG. 12D, or from underwater thermal springs 404, as shown in FIG. 12E.

By using seawater affected by volcanic activities or by spring water from thermal springs for the evaporation process of the Floating Salt Farm 201, the produced crystallized salt and bittern can contain substantial amounts of specific chemical elements, such as Magnesium, Aluminum, Calcium, Potassium, Bromine, Silicon, Titanium, Copper, Zinc, Selenium, Lithium, Cerium, Neodymium, Dysprosium, Lanthanum, Europium, Yttrium, and Uranium.

The crystallized salt and bittern can also be produced to contain substantial amounts of specific chemical elements by placing contents such as volcanic rocks, which can be formed from magma and are found in volcanic areas, inside the evaporator tank 203, with the seawater during the evaporation process.

Figure 13A:
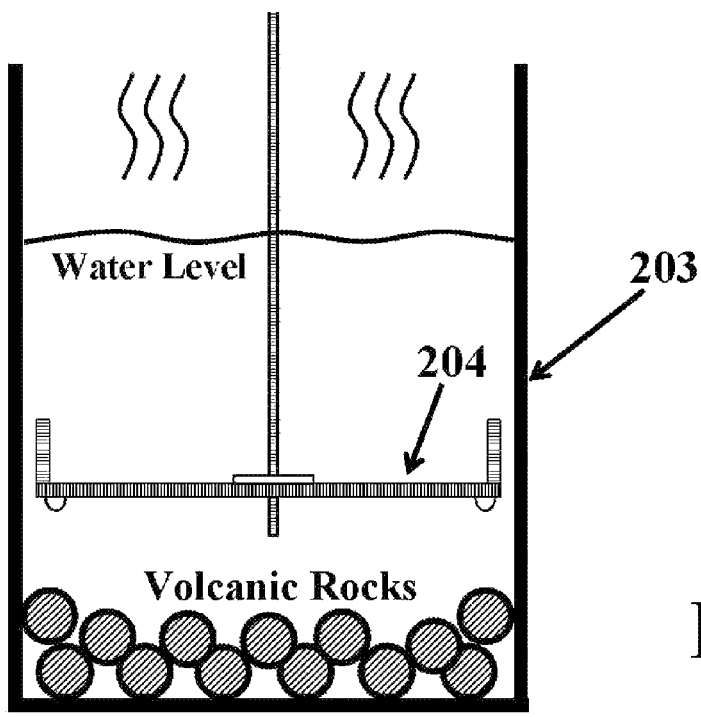
FIGS. 13A and 13B are side views of embodiments of volcanic rocks inside the evaporator tank during the evaporation process.

An embodiment of the evaporator tank 203 is shown in FIG. 13A, in which the evaporator tank 203 has an evaporator plate component 204 and volcanic rocks are placed below the evaporator plate component 204 with the seawater during the evaporation process to produce crystallized salt and bittern containing substantial amounts of specific chemical elements.

Figure 13B:
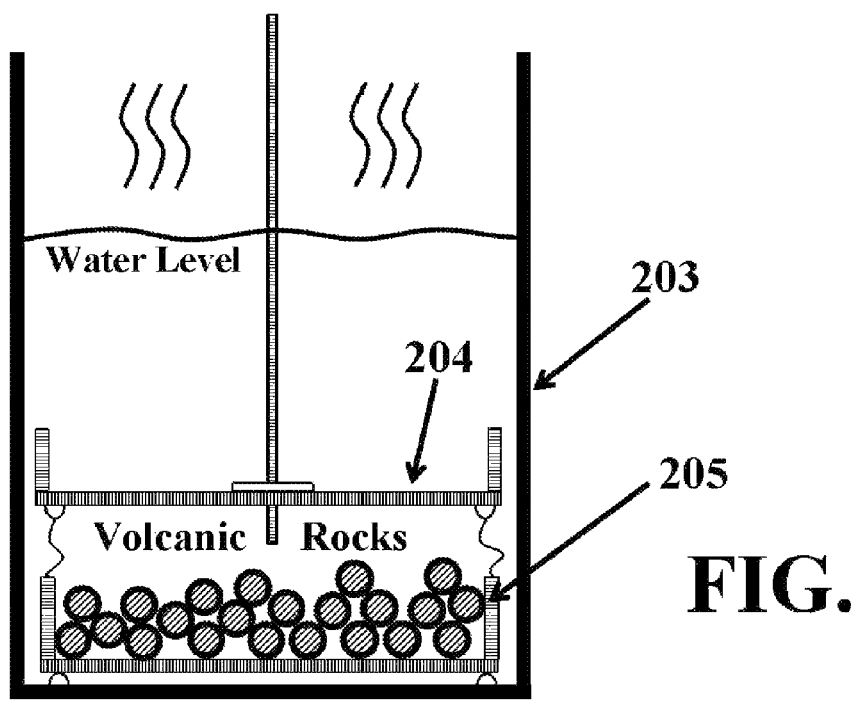

An embodiment of the evaporator tank 203 is shown in FIG. 13B, in which the evaporator tank 203 has an evaporator bin component 205 linked to the bottom of the evaporator plate component 204. The evaporator bin component 205 holds volcanic rocks and is located inside the evaporator tank 203 with the seawater during the evaporation process to produce crystallized salt and bittern containing substantial amounts of specific chemical elements.

The amount of specific chemical elements in the crystallized salt and bittern produced with the Floating Salt Farm 201 can be modified by adjusting the heating temperature and the heating time of the evaporation process accordingly.

The amount of specific chemical elements in the produced crystallized salt and bittern can be increased by reusing the produced bittern for other additional and multiple evaporation process cycles. After each evaporation process cycle, additional extracted seawater and/or other previously produced bittern can be added to the evaporator tank 203 and mixed with the produced bittern for the following evaporation process cycles. By running the evaporation process multiple cycles, the amount of specific chemical elements in the produced crystallized salt and bittern can be produced to be higher.

Figure 14:
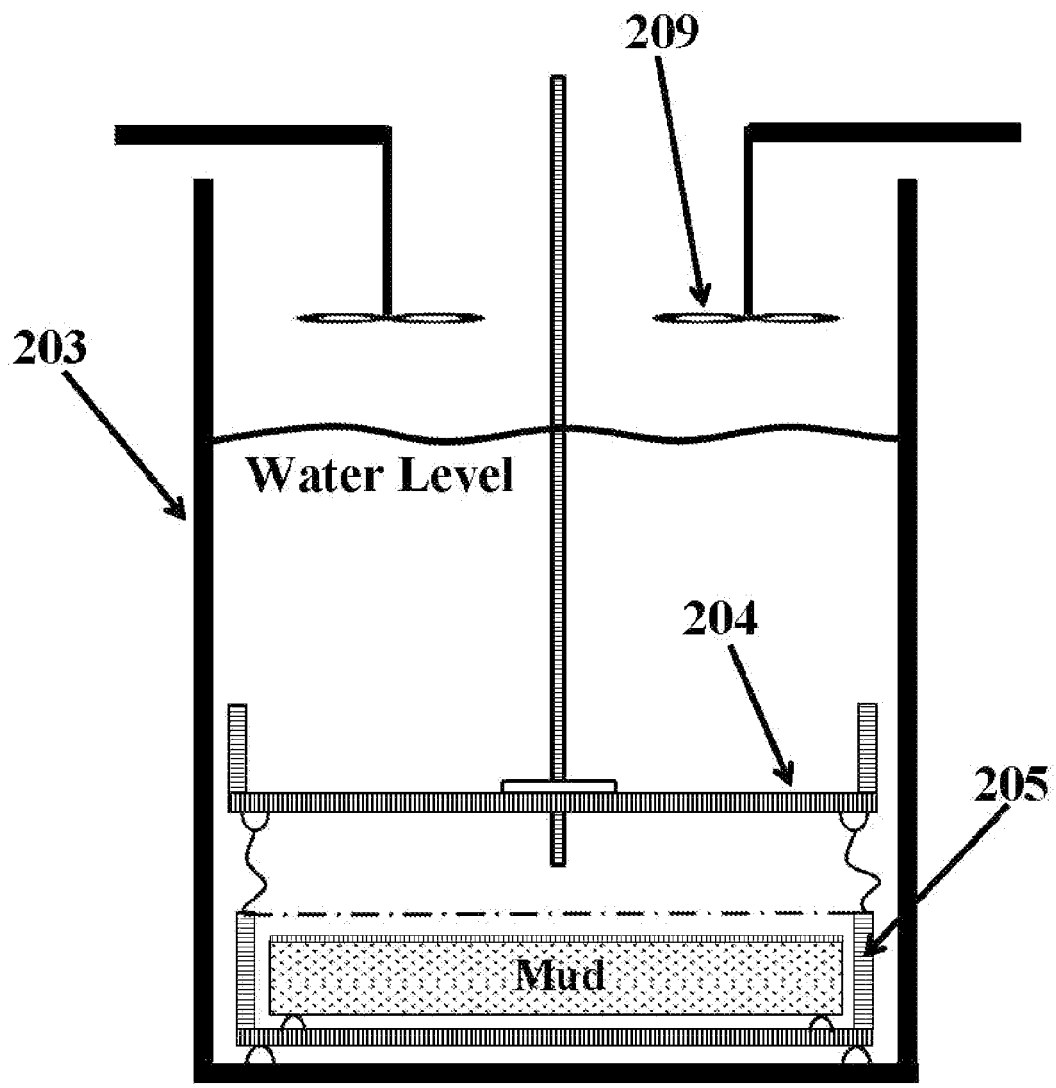
FIG. 14 is a side view of an embodiment of mud inside the evaporator tank during the evaporation process.

An embodiment of the evaporator tank 203 is shown in FIG. 14, in which the evaporator tank 203 has an evaporator bin component 205 holding mud to produce crystallized salt and bittern of similar quality as the conventional sun-dried salt and bittern produced in conventional salt ponds. The mud placed inside the evaporator bin component 205 can be mud conventionally used to produce conventional sun-dried salt and bittern at conventional salt ponds or can be suitable mud or clay found at other locations. The wind propeller components 209 in this embodiment are installed to be inside the evaporator tank 203 and are used to emulate the sea breeze used for the evaporation process.

Figure 15A:
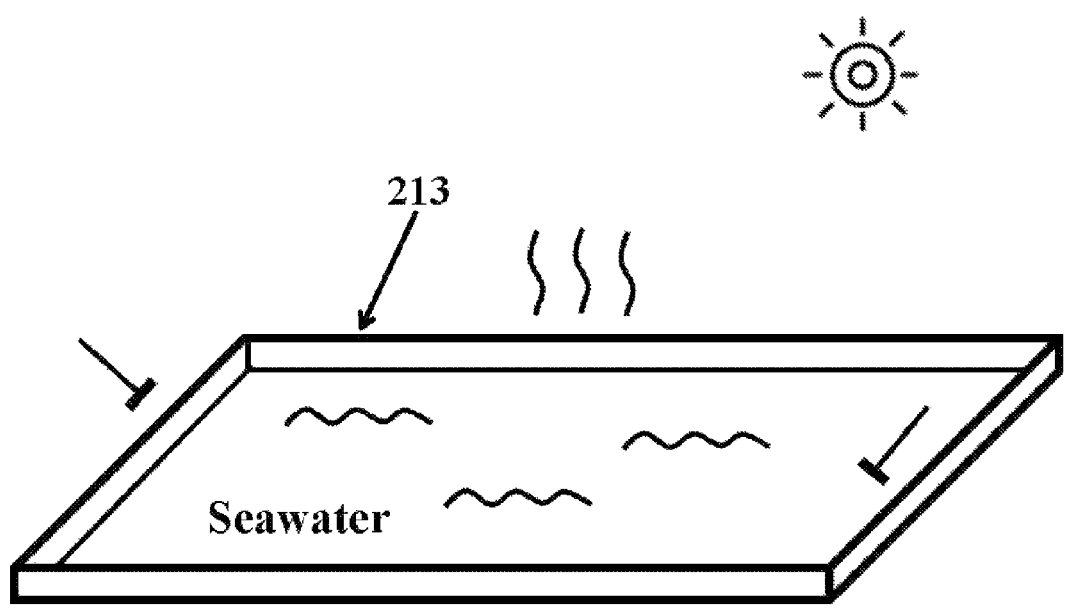
FIG. 15A is a perspective view of an evaporator basin.
Figure 15B:
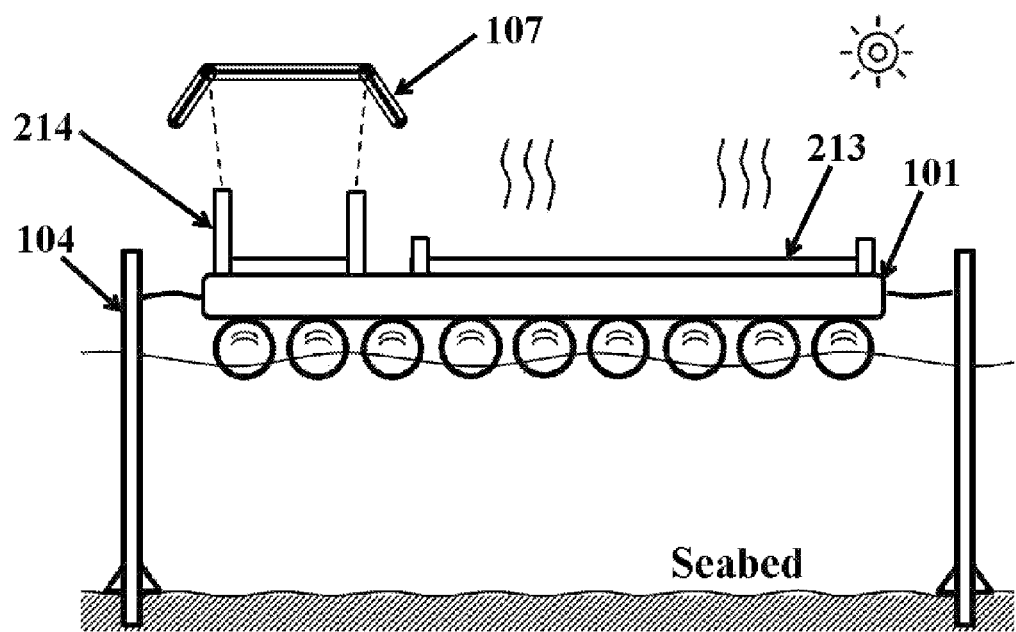
FIG. 15B is a side view of an evaporator basin installed onto the top of the buoyant foundation.
Figure 15C:
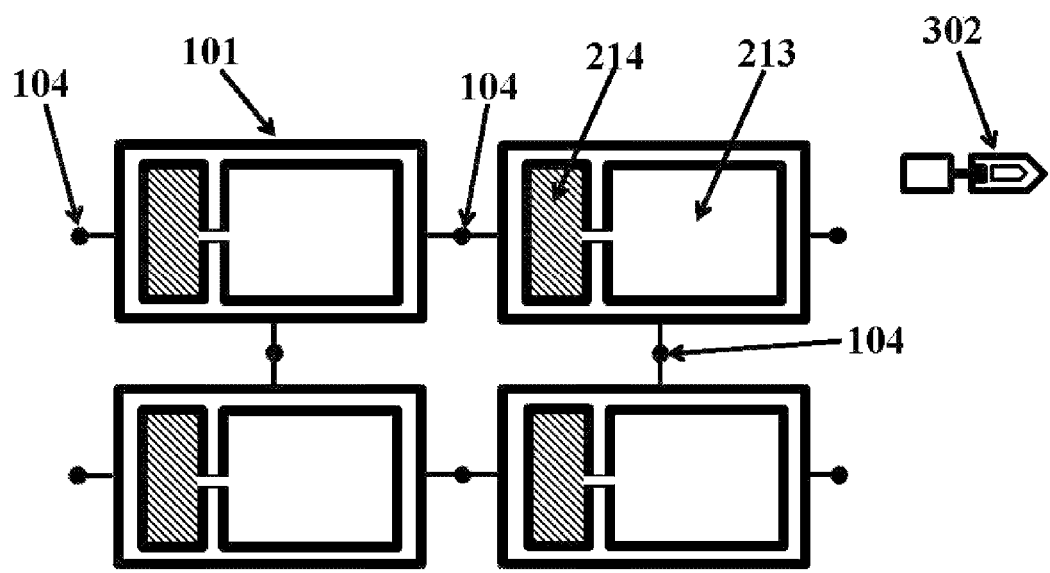
FIG. 15C is a top view of evaporator basins connected to saline water storage tanks installed onto the top of buoyant foundations.

Conventional sun-dried salt can be produced at offshore locations by using an evaporator basin 213, as shown in FIG. 15A. The evaporator basin 213 is installed onto the top of the buoyant foundation 101, in which the buoyant foundation 101 can be reinforced with offshore structures 104. The connection between the buoyant foundation 101 and the offshore structure 104 can be detachable. A buoyant seawall 106 can be installed to increase the buoyancy and the stability of the buoyant foundation 101, which is located around the perimeter of and slightly away from the buoyant foundation 101, as shown in FIG. 3. The connection between the buoyant foundation 101 and the buoyant seawall 106 can be detachable. The evaporator basin 213 has different dimensions than the evaporator tank 203, in which the evaporator basin 213 has dimensions which span most of the buoyant foundation 101 surface and has a lower height than the evaporator tank 203. To produce conventional sun-dried salt, seawater is first extracted into the evaporator basin 213 and is then harvested through solar evaporation. During periods of rain, the harvested seawater in the evaporator basin 213 is transferred to the saline water storage tank 214, in which the saline water storage tank 214 is installed onto the top of the buoyant foundation 101 and can be protected with an installed customized ceiling 107, as shown in FIGS. 15B and 15C. After harvesting the crystallized salt in the evaporator basin 213, the produced crystallized salt is delivered to the other Floating Salt Farm components 202 by using a transport vessel 302, as shown in FIG. 15C.

What is claimed is:

1. A system situated at an offshore location to produce crystallized salt and bittern through the evaporation process by using extracted seawater, comprising:
  a buoyant foundation situated on the seawater, comprising:
    a motor propeller component installed to the buoyant foundation, motor propeller component capable of moving the buoyant foundation to specific offshore locations;
  offshore structures installed on the seabed, offshore structures capable of reinforcing the buoyant foundation;
  a buoyant seawall installed to the buoyant foundation, buoyant seawall capable of increasing the buoyancy and stability of the buoyant foundation;
  Floating Salt Farm components to produce crystallized salt and bittern.

2. The system of claim 1, wherein said buoyant foundation is capable of being moved to a specific offshore location by using a towboat.

3. The system of claim 1, wherein said offshore structures are used in combination with onshore structures to reinforce said buoyant foundation.

4. The system of claim 1, wherein the connection of said offshore structure and said buoyant foundation is detachable.

5. The system of claim 1, wherein the connection of said buoyant seawall and said buoyant foundation is detachable.

6. The system of claim 1, wherein said Floating Salt Farm components are separately installed at different offshore locations.

7. The system of claim 1, wherein said Floating Salt Farm components are separately installed at an offshore location and at an onshore location.

8. The system of claim 1, wherein said Floating Salt Farm components are capable of being powered by electricity, gas, and fuel.

9. The system of claim 8, wherein said electricity, gas, and fuel are capable of being used in combination to power said Floating Salt Farm components.

10. The system of claim 8, wherein said electricity is capable of being supplied from offshore fixed-bottom wind turbines.

11. The system of claim 8, wherein said electricity is capable of being supplied from offshore floating wind turbines.

12. A method for producing crystallized salt and bittern containing amounts of specific chemical elements through the evaporation process of the Floating Salt Farm by using seawater affected by volcanic activities.

13. The method according to claim 12, wherein said volcanic activities originate from underwater volcanoes.

14. The method according to claim 12, wherein said volcanic activities originate from volcanoes located above sea level.

15. The method according to claim 12, wherein said crystallized salt and bittern contain said amounts of specific chemical elements by using seawater extracted from specific water depths and from specific offshore locations.

16. The method according to claim 12, wherein said amounts of specific chemical elements contained in said crystallized salt and bittern are capable of being adjustable.

17. The method according to claim 12, wherein said amounts of specific chemical elements of said crystallized salt and bittern are capable of being increased by placing contents inside the evaporator tank of said Floating Salt Farm during said evaporation process.

18. The method according to claim 17, wherein said contents are volcanic rocks.

19. The method according to claim 17, wherein said contents are mud.

20. The method according to claim 12, wherein said crystallized salt and bittern containing said amounts of specific chemical elements are produced through said evaporation process of said Floating Salt Farm by using seawater affected by spring water from thermal springs.

21. The method according to claim 20 wherein said spring water originates from thermal springs located above sea level.

22. The method according to claim 20, wherein said spring water originates from underwater thermal springs.

23. A method for producing conventional sun-dried salt at offshore locations by means of solar evaporation and by using an evaporator basin installed onto the top of the buoyant foundation.

* * * * *